United States Patent
Savo et al.

(10) Patent No.: US 11,180,591 B2
(45) Date of Patent: Nov. 23, 2021

(54) POLYMERIZATION PROCESS INVOLVING ADDITION OF MONOFUNCTIONAL VINYL MONOMER

(71) Applicants: DDP SPECIALTY ELECTRONIC MATERIALS US, INC., Collegeville, PA (US); DDP SPECIALTY ELECTRONIC MATERIALS US 8, LLC, Collegeville, PA (US)

(72) Inventors: Andrew M. Savo, Cherry Hill, NJ (US); Thomas Jones, Jenkintown, PA (US); Michael Ostrander, Ambler, PA (US)

(73) Assignees: DDP SPECIALTY ELECTRONIC MATERIALS US, INC.; DDP SPECIALTY ELECTRONIC MATERIALS US 8, LLC

( * ) Notice: Subject to any disclaimer, the term of this patent is extended or adjusted under 35 U.S.C. 154(b) by 0 days.

(21) Appl. No.: 16/759,143

(22) PCT Filed: Oct. 24, 2018

(86) PCT No.: PCT/US2018/057386
§ 371 (c)(1),
(2) Date: Apr. 24, 2020

(87) PCT Pub. No.: WO2019/094199
PCT Pub. Date: May 16, 2019

(65) Prior Publication Data
US 2021/0179755 A1    Jun. 17, 2021

Related U.S. Application Data

(60) Provisional application No. 62/584,219, filed on Nov. 10, 2017.

(51) Int. Cl.
*C08F 212/08*    (2006.01)
*C08F 212/36*    (2006.01)

(52) U.S. Cl.
CPC .......... *C08F 212/08* (2013.01); *C08F 212/36* (2013.01); *C08F 2500/24* (2013.01); *C08F 2800/20* (2013.01)

(58) Field of Classification Search
None
See application file for complete search history.

(56) References Cited

U.S. PATENT DOCUMENTS

| | | |
|---|---|---|
| 3,792,029 A | 2/1974 | Roubinek et al. |
| 4,564,633 A | 1/1986 | LaHann |
| 4,665,103 A | 5/1987 | Digiulio |
| 5,068,255 A | 11/1991 | Harris |
| 5,607,533 A * | 3/1997 | Kato ...................... G03G 13/16 101/467 |
| 2010/0144956 A1* | 6/2010 | Najima ................ C09D 133/06 524/522 |

FOREIGN PATENT DOCUMENTS

EP    0098130 A2    6/1983

OTHER PUBLICATIONS

PCT International Search Report, dated Feb. 4, 2019, for International Application No. PCT/US2018/057386, filed Oct. 24, 2018; ISA/EP; Rudolf Lux, Authorized Officer.

* cited by examiner

*Primary Examiner* — Richard A Huhn
(74) *Attorney, Agent, or Firm* — Carl Hemenway; Kenneth Crimaldi

(57) ABSTRACT

Provided is a process of making a collection of polymeric beads, wherein the beads comprise
(i) 75 to 99.7% by weight, based on the weight of the bead, polymerized units of monofunctional vinyl monomer, and
(ii) 0.3 to 25% by weight, based on the weight of the bead, polymerized units of multifunctional vinyl monomer;
wherein the process comprises
(a) providing an aqueous suspension of monomer droplets comprising initiator, multifunctional vinyl monomer, and monofunctional vinyl monomer;
(b) initiating polymerization of the monomer in the monomer droplets;
(c) while the polymerization of the monomer in the monomer droplets is occurring, adding a monomer feed solution to the suspension.

5 Claims, No Drawings ically more expensive than other monomers, and so reducing the amount of multifunctional vinyl monomer will normally reduce the cost of producing the polymeric beads. It is also desirable to produce polymeric beads that lack
POLYMERIZATION PROCESS INVOLVING ADDITION OF MONOFUNCTIONAL VINYL MONOMER A useful method of producing polymeric beads is suspension polymerization, which is a process in which monomer droplets are suspended in an aqueous medium and then the monomer in the droplets is polymerized to form polymeric beads. When a mixture of monomers is present in the monomer droplet, it is contemplated that the monomers may react at different rates, thus forming an inhomogeneous polymeric bead. For example, it is contemplated that one or more regions within the droplet may form copolymer that has a proportion of polymerized units of the more-reactive monomer that is higher than the average proportion of the more-reactive monomer that is present in the mixture of monomers in the whole droplet. Therefore it is also contemplated that one or more regions within the droplet may form copolymer that has a proportion of polymerized units of the more-reactive monomer that is lower than the average proportion of the more-reactive monomer that is present in the mixture of monomers in the whole droplet. In general, it is expected that some heterogeneity in the bead often arises due to the different reactivities of the monomers.

It is desired to provide a process for making polymeric beads that involves polymerization of a mixture of monomers and that can exert some control over the homogeneity or the type of inhomogeneity that forms in the resulting polymeric beads.

Many polymeric beads carry covalently bound ion-exchange groups such as sulfonic acid groups, carboxyl groups, tertiary amine groups, or quaternary amine groups. Such polymeric beads that have ion-exchange groups are known as ion exchange resins. In many cases, to make ion exchange resins, monomers that lack ion-exchange groups are polymerized to form polymeric beads that lack ion exchange functional groups, and those polymeric beads are subjected to one or more chemical reaction to attach the desired ion-exchange group or groups. An important characteristic of ion exchange resins is the moisture hold capacity (MHC). The MHC is measured by allowing the ion exchange resins to come into equilibrium with air at 100% humidity and then measuring the amount of water adsorbed by the polymeric beads. For many ion exchange resins that are intended to be used for a specific purpose, there is a specific desired target range of MHC values, and it is considered that ion exchange resins having MHC in that target range are especially suitable for that intended purpose.

Many polymeric beads that lack ion exchange groups are copolymers of one or more monofunctional vinyl monomer and one or more multifunctional vinyl monomer. Another important characteristic of such polymer beads is the amount of polymerized units of multifunctional vinyl monomer. In the past, it was often found that the MHC value of an ion exchange resin was largely determined by the amount of polymerized units of multifunctional vinyl monomer. For example, in some cases, to achieve the desired MHC value, it was necessary to use an undesirably large amount of multifunctional vinyl monomer.

It is desirable to produce ion exchange resins that have a desired target MHC value and that have a lower amount of polymerized units of multifunctional vinyl monomer than was previously necessary. The multifunctional vinyl monomer is usually more expensive than other monomers, and so reducing the amount of multifunctional vinyl monomer will normally reduce the cost of producing the polymeric beads. It is also desirable to produce polymeric beads that lack ion-exchange groups and that are capable of being transformed into such desirable ion exchange resins.

U.S. Pat. No. 3,792,029 describes a process of suspension polymerization in which, during suspension polymerization of a monomer mixture, an emulsion containing the more-reactive monomer is added to the suspension while polymerization is occurring. Also, in the process of U.S. Pat. No. 3,792,029, the added monomer is a substantial quantity relative to the quantity of starting monomer, and the concentration of the multifunctional vinyl monomer in the fed monomer is higher than in the starting monomer. It is considered that the process of U.S. Pat. No. 3,792,029 will result in a different polymer composition profile compared to a process performed without feeding monomer during polymerization. It is further considered that the process of U.S. Pat. No. 3,792,029 will result in an interpenetrating polymer network structure which could have significant impact on ion exchange resin performance.

It is desired to provide a process with one or more of the following features: neat monomer is added to a suspension polymerization process; the amount of monomer fed during polymerization is less than the amount of monomer present prior to the beginning of polymerization; the ratio of multifunctional vinyl monomer to monofunctional vinyl monomer in the feed is lower than the ratio of multifunctional vinyl monomer to monofunctional vinyl monomer present prior to the beginning of the polymerization; and/or improving the consistency and/or efficiency of mass transfer of monomer of the monomer being fed into the monomer droplets. It is considered that these features provide a process that is simpler to perform than the process of U.S. Pat. No. 3,792,029. It is also considered that these features would provide a process that has less tendency to produce an interpenetrating network structure than the process of U.S. Pat. No. 3,792,029. It is also desired to provide polymeric beads that, after transformation into ion exchange resins, have a target WIC level with lower levels of polymerized units of multifunctional vinyl monomer than were previously needed.

The following is a statement of the invention.

A first aspect of the present invention is a process of making a collection of polymeric beads, wherein the beads comprise
  (i) 75 to 99.7% by weight, based on the weight of the bead, polymerized units of monofunctional vinyl monomer, and
  (ii) 0.3 to 25% by weight, based on the weight of the bead, polymerized units of multifunctional vinyl monomer;
  wherein the process comprises
  (a) providing an aqueous suspension of monomer droplets comprising initiator, multifunctional vinyl monomer, and monofunctional vinyl monomer;
  (b) initiating polymerization of the monomer in the monomer droplets;
  (c) while the polymerization of the monomer in the monomer droplets is occurring, adding a monomer feed solution to the suspension,
    wherein the adding begins at a time when the extent of polymerization of monomer in the monomer droplets (EXTSTART) is 0% to 50%, and
    wherein the adding ends at a time after EXTSTART when the extent of polymerization of monomer in the monomer droplets (EXTSTOP) is 5% to 100%;
    wherein the feed solution comprises monomer in an amount, by weight based on the weight of the feed solution, of 90% to 100%;

wherein the feed solution comprises monofunctional vinyl monomer in an amount, by weight based on the weight of the feed solution, of 50% to 100%.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure

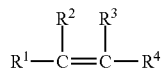

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$ and $R^2$ is hydrogen, $R^3$ is hydrogen or alkyl, and —$R^4$ has the structure

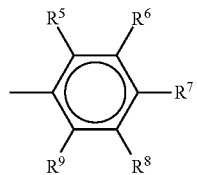

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

A reaction among monomers to form one or more polymers is referred to herein as a polymerization process.

As used herein, an initiator is a molecule that is stable at ambient conditions but that is capable under certain conditions of producing one or more fragments that bears a free radical, and that fragment is capable of interacting with a monomer to start a free radical polymerization process. The conditions that cause production of a fragment bearing a free radical include, for example, elevated temperature, participation in an oxidation-reduction reaction, exposure to ultraviolet and/or ionizing radiation, or a combination thereof.

As used herein the phrase "total monomer" refers to all the monomers used in making a polymer, including monomers that are present when initiation of polymerization begins and all of those that may be added during the polymerization processes.

A polymer is said herein to contain polymerized units of the monomers used in making the polymer, even if some or all of those polymerized units are, after polymerization, altered by the addition of one or more functional groups. For example, a copolymer made from styrene and DVB in a weight ratio of styrene:DVB of 90:10 is said to have 90% by weight polymerized units of styrene. If that copolymer were to be then altered by reaction with sulfuric acid to replace some of the hydrogen atoms on aromatic rings with sulfonic acid groups, the resulting functionalized polymer would still be said to have 90% by weight polymerized units of styrene.

As used herein, an inhibitor is a molecule that reacts with a vinyl monomer radical or with the radical on a growing vinyl polymer chain to form a new radical that does not participate in vinyl polymerization or to form a species that does not participate in vinyl polymerization.

A porogen is a compound that is soluble in the monomer or mixture of monomers used in the practice of the present invention. That is, at 25° C., 100 grams or more of porogen will dissolve in 100 grams of monomer or mixture of monomers used in the practice of the present invention. The polymer does not imbibe large amounts of porogen. That is, at 25° C., the polymer formed in the practice of the present invention imbibes 5 grams or less of porogen per 100 grams of polymer.

Macroporous polymeric beads have a porous structure with average pore diameter of 20 nm or larger. Pore diameter is measured using the Brunauer-Emmett-Teller (BET) method using nitrogen gas. Macroporous polymeric beads are normally made by incorporating a porogen into monomer droplets. The porogen is soluble in the monomer, but the polymer does not dissolve in the porogen, so that, as the polymer forms, phase-separated domains of porogen remain. After polymerization, the porogen is removed by evaporation or by washing with solvent. The porous structure of the polymeric bead is the empty space left when the porogen is removed from its phase-separated domains.

Gel type polymeric beads are made without the use of porogen. The pores in gel type polymeric beads are the free volumes between the atoms in the entangled, possibly crosslinked polymer chains of the polymeric bead. The pores in gel type polymeric beads are smaller than 20 nm. In some cases, the pores in gel type resins are too small to be detected using the BET method.

As used herein, ion exchange is a process in which a solution comes into contact with an ion exchange resin. Prior to the contact with the solution, the ion exchange resin has functional groups of a certain charge, and has ions of the opposite charge associated with the functional groups. When the solution comes in contact with the ion exchange resin, some ions in solution become attached to the ion exchange resin by exchanging places with ions of the same charge that had been associated with the functional groups on the ion exchange resin.

A compound is said herein to be water-soluble if 5 grams or more of the compound forms a stable solution in 100 ml of water at 25° C. In the case of some water-soluble polymers, the water may need to be heated above 25° C. in order to make the polymer dissolve, but after cooling to 25° C., the solution is stable when held at 25° C.

A suspension is a composition that has particles of one substance distributed through a liquid medium. The distributed particles may be liquid or solid; distributed liquid particles are called droplets. The medium is "aqueous" if the medium contains 90% or more water by weight, based on the weight of the medium. A suspension may or may not be stable. That is, the distributed particles may or may not have a tendency to settle to the bottom of the container or to float to the top of the container, and mechanical agitation may or may not be required to keep the particles distributed in the medium.

A polymeric bead is a particle that contains 90% or more by weight, based on the weight of the particle, organic polymer. A polymeric bead is spherical or nearly spherical. A polymeric bead is characterized by its radius. If the bead is not spherical, the radius of the bead is taken herein to be the radius of a "reference sphere," which is the imaginary sphere that has the same volume as the bead. Whether a particle is spherical or not is assessed by the "sphericity," represented by the Greek letter Ψ. For a particle having volume VP, and principal axes of length a (long), b (medium) and c (short), the sphericity is $$\Psi = \left(\frac{bc}{a^2}\right)^{1/3}$$

As used herein, "ambient temperature" is synonymous with "room temperature" and is approximately 23° C.

A collection of particles has harmonic mean diameter (HMD) defined as follows:

$$HMD = \frac{n}{\sum_{i=1}^{n}(1/d_i)}$$

where n is the number of particles, and $d_i$ is the diameter of the $i^{th}$ particle.

As used herein, a suspension polymerization process is a "seeded" process if the process involves a state (Si) in which the monomer droplets contain 80% or more monomer by weight based on the weight of the droplets; in which the monomer droplets are not undergoing polymerization; and in which the monomer droplets contain polymer in an amount of 1% or more by weight based on the weight of the droplets. In a seeded process, after state (Si), polymerization of the monomer in the monomer droplets is initiated. In a typical seeded process, a suspension of polymeric particles is provided, then monomer is added to the suspension, the monomer imbibes into the polymeric particles, and then polymerization of monomer is initiated.

Ratios are characterized herein as follows. For example, if a ratio is said to be 5:1 or higher, it is meant that the ratio may be 5:1 or 6:1 or 100:1 but may not be 4:1. To state this characterization in a general way, if a ratio is said to be X:1 or higher, then the ratio is Y:1, where Y is greater than or equal to X. Similarly, for example, if a ratio is said to be 2:1 or lower, it is meant that the ratio may be 2:1 or 1:1 or 0.001:1 but may not be 3:1. To state this characterization in a general way, if a ratio is said to be Z:1 or lower, then the ratio is W:1, where W is less than or equal to Z.

The process of the present invention involves monomer droplets that contain vinyl monomer and initiator. The following is a description of the monomer droplets as they exist prior to the beginning of polymerization.

The monomer droplets optionally additionally contain porogen. It is useful to characterize the sum of the amount of monomer plus the amount of porogen, as a percentage by weight based on the weight of the monomer droplets. Preferably, that sum is 95% or higher; more preferably 97% or higher; more preferably 99% or higher.

Preferably, porogen is either absent or, if present, is present in relatively small amounts. If porogen is present in the monomer droplets, preferably the amount of porogen is limited to an amount, by weight based on the weight of the monomer droplets, of 10% or less; more preferably 3% or less; more preferably 1% or less; more preferably 0.3% or less. More preferably, no porogen is present in the monomer droplets.

The following is a description of the monomer droplets as they exist prior to initiation of polymerization.

Preferably, the amount of monomer in the monomer droplets is, by weight based on the weight of the droplets, 95% or more; more preferably 97% or more; more preferably 99% or more.

Preferred vinyl monomers are styrenic monomers, acrylic monomers, and mixtures thereof. Preferably, all the monomers used are selected from styrenic monomers, acrylic monomers, and mixtures thereof. More preferably, all the monomers used are selected from styrenic monomers. The vinyl monomer includes one or more monofunctional vinyl monomers. Preferred monofunctional vinyl monomers are acrylic and styrenic monofunctional vinyl monomers; more preferred are monofunctional styrenic monomers; more preferred is styrene. The vinyl monomer also includes one or more multifunctional vinyl monomers. Preferred multifunctional vinyl monomers are multifunctional styrenic monomers; more preferred is divinyl benzene. As used herein, the term "divinyl benzene" or "DVB" refers to a mixture containing approximately 63% pure chemical DVB by weight and approximately 37% ethylvinyl benzene (EVB) by weight, possibly with other chemicals in a total amount of 1% or less. Therefore, for example, a composition that is said to contain 4% DVB will contain, in addition to 4% DVB, approximately 2.35% EVB. Preferably, the amount of vinyl chloride is, by weight based on the total weight of all monomers, 0 to 0.1%, more preferably 0 to 0.01%; more preferably 0%.

Preferably, the amount of styrenic monomer in the droplets prior to initiation of polymerization, by weight based on the weight of all monomers in the droplets, is 50% or higher; more preferably 75% or higher; more preferably 88% or higher; more preferably 94% or higher; more preferably 97% or higher; more preferably 100%.

The monofunctional vinyl monomer located in the droplets prior to initiation of polymerization is labeled MONO1. Preferably, the amount of MONO1 is, by weight based on the weight of all monomers in the droplets, 75% or more; more preferably 85% or more: more preferably 90% or more; more preferably 94% or more. Preferably, the amount of MONO1 is, by weight based on the weight of all monomers in the droplets, 99.5% or less; more preferably 99% or less; more preferably 98.5% or less.

Preferably, the amount of multifunctional vinyl monomer in the droplets prior to initiation of polymerization is, by weight based on the weight of all monomers in the droplets, 0.5% or more; more preferably 1% or more; more preferably 1.5% or more. Preferably, the amount of multifunctional vinyl monomer in the droplets is, by weight based on the weight of all monomers in the droplets, 25% or less; more preferably 15% or less; more preferably 10% or less; more preferably 6% or less.

It is useful to characterize the ratio

MONORATIO=100*(WMONOTOTAL−WMONO1)/WMONOTOTAL where WMONO1 is the weight of MONO1 (monofunctional vinyl monomer present prior to initiation of polymerization); WMONOTOTAL is the total weight of monofunctional vinyl monomer used in the entire polymerization process, including monofunctional vinyl monomer present prior to initiation and monofunctional vinyl monomer added after initiation. Preferably MONORATIO is 0.05% or more; more preferably 0.1% or more; more preferably 0.2% or more; more preferably 0.4% or more. Preferably MONORATIO is 30% or less; more preferably 25% or less; more preferably 20% or less; more preferably 15% or less. Preferably, MONORATIO is 2% or more; more preferably 4% or more; more preferably 6% or more; more preferably 8% or more.

The process of the present invention involves a suspension of the monomer droplets in an aqueous medium, prior to initiation of polymerization. Preferably, the total amount of monomer prior to initiation of polymerization, by volume based on the total volume of the suspension, prior to initiation of polymerization, is 15% or more; more preferably 20% or more; more preferably 25% or more; more preferably 30% or more. Preferably, the total amount of monomer prior to the initiation of polymerization, by volume based on the total volume of the suspension, is 55% or less; more preferably 50% or less; more preferably 45% or less.

After the completion of polymerization, the amount of the polymeric beads in the suspension, by volume based on the total volume of the suspension, is 18% or more; more preferably 23% or more; more preferably 28% or more. After the completion of polymerization, the amount of the polymeric beads in the suspension, by volume based on the total volume of the suspension, is 58% or less; more preferably 53% or less; more preferably 48% or less.

The aqueous medium optionally contains one or more dissolved nitrite salt, the derivatives of that nitrite salt, or a combination thereof. A nitrite salt has the formula $M(NO_2)_v$, where M is an ammonium cation or an alkali metal cation or an alkaline earth cation; and where v is 1 when M is ammonium cation or an alkali metal cation, and v is 2 when M is an alkaline earth cation. It is considered that when a nitrite salt is dissolved in water, the nitrite ion may undergo chemical reactions to form derivatives such as, for example, nitrous acid and/or compounds of the formula $N_xO_y$. The amount of these derivatives is characterized by the weight of the dissolved salt plus the amount of salt that would have to be dissolved in order to produce the amount of derivatives that are present in the aqueous medium. The preferred amount of nitrite salt and its derivatives is, by weight based on the weight of the aqueous medium, 0.005% or more; more preferably 0.008% or more; more preferably 0.011% or more; more preferably 0.014% or more. The preferred amount of nitrite salt and its derivatives is, by weight based on the weight of the aqueous medium, 0.5% or less; more preferably 0.4% or less; more preferably 0.3% or less; more preferably 0.2% or less.

A preferred nitrite salt is sodium nitrite. Preferably the derivatives of nitrite salt are derivatives of sodium nitrite.

The monomer droplets preferably contain one or more initiator. Preferred initiators have solubility in 100 mL of water at 25° C. of 1 gram or less; more preferably 0.5 gram or less; more preferably 0.2 gram or less; more preferably 0.1 gram or less. Preferred are peroxide and hydroperoxide initiators; more preferred are peroxide initiators; more preferred are benzoyl peroxide and derivatives thereof; more preferred is benzoyl peroxide. Preferably, the weight ratio of initiator to total monomer is 0.0005:1 or higher; more preferably 0.002:1 or higher; more preferably 0.005:1 or higher. Preferably, the weight ratio of initiator to total monomer is 0.02:1 or lower; more preferably 0.01:1 or lower; more preferably 0.007:1 or lower.

The monomer droplets optionally contain one or more porogen. Preferably, little or no porogen is present. That is, preferably either porogen is absent or else, if present, the amount of porogen is, by weight based on the weight of monomer droplets, 1% or less; more preferably 0.1% or less. More preferably, no porogen is present in the monomer droplets.

Monomers, as normally supplied by manufacturers, contain relatively small amounts of inhibitors, to prevent accidental polymerization during storage. Common inhibitors are quinones (for example, 1,4-benzoquinone) and hindered phenols (for example, 4-tert-butylpyrocatechol, also called 4-t-butylcatechol).

Preferably, prior to the initiation of polymerization, the monomer droplets either contain no polymer of any kind or else contain small amounts of polymer of any kind. That is, if any polymer is present in the monomer droplets, the total amount of polymer is preferably, by weight based on the weight of the monomer droplets, 0.1% or less; more preferably zero.

The aqueous medium preferably contains one or more water-soluble polymer. Preferred water-soluble polymers are water-soluble polyvinyl alcohol polymers, water-soluble derivatives of cellulose, quaternary ammonium polymers, gelatin, and mixtures thereof. More preferred water-soluble polymers are water-soluble polyvinyl alcohol polymers, water-soluble derivatives of cellulose, and mixtures thereof. Among quaternary ammonium polymers, preferred are polymers of diallyl dimethylammonium chloride (DADMAC). Among water-soluble derivatives of cellulose, preferred are carboxymethyl methylcelluloses. Among polyvinyl alcohol polymers, preferred are those with degree of hydrolysis of 80% to 90%. Preferably the aqueous medium contains one or more water-soluble polyvinyl alcohol polymers and one or more water-soluble derivatives of cellulose.

When one or more water-soluble polymers are used, preferably the total amount of water-soluble polymers is, by weight based on the weight of the aqueous medium, 0.02% or higher; more preferably 0.05% or higher; more preferably 0.1% or higher. When one or more water-soluble polymers are used, preferably the total amount of water-soluble polymers is, by weight based on the weight of the water, 1% or less; more preferably 0.5% or less.

Also suitable are other methods of stabilizing monomer droplets, which may be used instead of one or more water-soluble polymers or in addition to one or more water-soluble polymers. For example, solid particles that are smaller than the monomer droplets may reside at the surface of the droplets and stabilize the droplets. One example of such solid particles is colloidal silica particles.

The aqueous suspension of monomer droplets optionally contains one or more suspension aids. Suspension aids are considered to stabilize the monomer droplets. Suspension aids may be introduced by adding them to the aqueous phase or by adding them to the monomer droplest or by a combination thereof. Regardless of how the a suspension aid is introduced, a preferred amount of suspension aid, by weight based on the weight of the monomer droplets, 0.001% to 0.1%. A preferred suspension aid is 4-vinylphenyl boronic acid.

Gelatin may or may not be present in the suspension. When gelatin is present, the amount is, by weight based on the weight of the water, 2% or less; or 1% or less; or 0.5% or less. Preferred embodiments have little or no gelatin. Preferably the amount of gelatin is sufficiently low that the amount of gelatin is, by weight based on the weight of water, 0 to 0.01%; more preferably 0 to 0.001%. More preferably the amount of gelatin is zero.

The nature of the step that initiates polymerization depends in part on the nature of the initiator that is used. For example, when a thermal initiator is used, initiation conditions involve establishing a temperature above 25° C. that is high enough for a significant fraction of the initiator molecules to decompose to form free radicals. For another example, if a photoinitiator is used, initiation conditions involve exposing the initiator to radiation of sufficiently low wavelength and of sufficiently high intensity for a significant fraction of the initiator molecules to decompose to form free radicals. For another example, when the initiator is a redox initiator, initiation conditions involve the presence of sufficiently high concentration of both the oxidant and the reductant such that a significant number of free radicals are produced. Preferably, a thermal initiator is used. Preferably, initiation conditions involve temperature of 65° C. or higher; more preferably 70° C. or higher. That is, preferably the suspension is provided at a temperature below 40° C., and the initiator that is present does not produce significant number of free radicals at that temperature. Then, preferably, step (b) involves raising the temperature to initiation conditions.

After step (b), while polymerization is taking place, at any moment, the extent of the free radical polymerization in the vessel that contains the suspension may be characterized as follows.

Extent=100*PM/TM where PM is the mass of polymer formed by the free radical polymerization process, and TM is the total mass of monomer that has been added to the vessel up to that moment, including monomer in droplets prior to polymerization and monomer added in the monomer feed solution up to that moment.

Prior to the beginning of the polymerization process, droplets are present in the suspension, and the droplets contain vinyl monomer and initiator. Preferably the droplets are distributed throughout the aqueous medium. Preferably the composition of the aqueous medium contains water in the amount, by weight based on the weight of the aqueous medium, of 90% or more; more preferably 95% or more; more preferably 98% or more. Compounds dissolved in the water are considered to be part of the continuous liquid medium. Preferably, the volume average particle size of the droplets is 50 μm to 1,500 μm.

In the process of the present invention, once the polymerization in the monomer droplets has begun, a feed solution is added to the suspension. The action of adding monomer to the suspension after polymerization has begun is known herein as "gradual addition," or GA. The feed solution may be added at any rate. The rate of adding the feed solution may be steady or may be faster at some times than other times. Adding the feed solution may be accomplished in a single continuous addition (which may be performed quickly or slowly), or adding the feed solution may be interrupted one or more times.

Adding the feed solution is begun when the extent of reaction is at a point herein labeled "EXTSTART." EXTSTART is between 0% and 50%, inclusive. Preferably, EXTSTART is 40% or lower; more preferably 30% or lower; more preferably 20% or lower; more preferably 10% or lower.

The extent of reaction "EXTSTOP" is the extent of reaction at which the last of the feed solution is added to the suspension. No feed solution is added to the suspension after EXTSTOP. EXTSTOP is 5% to 100%. Preferably EXTSTOP is 85% or less. Preferably the quantity

EXTDIFF=EXTSTOP−EXTSTART is 5% or higher; more preferably 20% or higher; more preferably 50% or higher; more preferably 60% or higher.

Preferably, the feed solution contains total vinyl monomer of all types in an amount, by weight based on the weight of the feed solution, 75% or more; more preferably 85% or more; more preferably 95% or more; more preferably 99% or more.

The amount of monofunctional vinyl monomer in the feed solution is, by weight based on the weight of the feed solution, 50% or more; preferably 60% or more; more preferably 70% or more; more preferably 80% or more; more preferably 90% or more; more preferably 95% or more; more preferably 99% or more.

For use in the feed solution, preferred monofunctional vinyl monomers are the same as those described above as preferred for use in monomer droplets. If multifunctional vinyl monomer is present in the feed solution, preferred multifunctional vinyl monomers are the same as those described above as preferred for use in monomer droplets.

It is useful to characterize the proportion of multifunctional vinyl monomer to monofunctional vinyl monomer and to compare that proportion in the droplets to the same proportion in the feed solution. WMONO1 is the total weight of monofunctional vinyl monomer in the droplets; WMULTI1 is the total weight of multifunctional vinyl monomer in the droplets; WMONO2 is the total weight of monofunctional vinyl monomer in the feed solution; WMULTI2 is the total weight of multifunctional vinyl monomer in the feed solution. The comparison ratio COMPRATIO is defined as the ratio of (WMULTI2/WMONO2) to (WMULTI1/WMONO1). Preferably, COMPRATIO is less than 1:1; more preferably 0.1:1 or less; more preferably 0.01:1 or less; more preferably 0:1.

Preferably, the feed solution either contains no initiator or else contains initiator in an amount, in parts per million by weight, of 100 ppm or less; more preferably 10 ppm or less; more preferably 1 ppm or less.

Preferably, the feed solution either contains no water or contains water in an amount, by weight based on the weight of the feed solution, of 70% or less; more preferably 20% or less; more preferably 10% or less; more preferably 3% or less; more preferably 1% or less; more preferably 0.3% or less; more preferably 0.1% or less.

It is also useful to characterize the total amount feed solution used throughout the process of the present invention. The total weight of all monomer in all of the feed solution added to the reaction vessel is WFEED. The total weight of all monomer in the monomer droplets prior to the initiation of polymerization is WDROP. The quantity % FEED is defined as

% FEED=100×WFEED/WDROP

Preferably, % FEED is 5% or more; more preferably 8% or more; more preferably 10% or more. Preferably, % FEED is 25% or less; more preferably 20% or less; more preferably 15% or less.

Preferably the process is not a seeded process.

Also envisioned are embodiments ("dispersion feed" embodiments) in which the feed solution is replaced by a feed composition that is a dispersion of monomer droplets in an aqueous medium. Such a dispersion may be any type of dispersion, including, for example, suspension, emulsion, microemulsion, or nanoemulsion. Such a dispersion optionally contains one or more water-soluble polymer as described above, one or more surfactant, one or more dispersant, or a mixture thereof. Among dispersion feed embodiments, preferred are emulsions. Among emulsions, preferred are those that contain one or more anionic surfactant.

In dispersion feed embodiments, the total amount of monomer in the feed composition is, by weight based on the weight of the feed composition, 5% or more; more preferably 10% or more; more preferably 20% or more; more preferably 40$ or more. In dispersion feed embodiments, the total amount of monomer in the feed composition is, by weight based on the weight of the feed composition, 60% or less; more preferably 55% or less.

In dispersion feed embodiments, it is useful to characterize the amount of monofunctional vinyl monomer as a weight percentage of the monomer content of the feed composition. In dispersion embodiments, preferably the amount of monofunctional vinyl monomer is, by weight based on the total weight of monomers in the feed composition, 98% to 100%; more preferably 99% to 100%.

In dispersion feed embodiments, the suitable and preferable conditions for feeding during polymerization (extent of reaction, etc.) are the same as those described above.

The present invention also involves a collection of polymeric beads. The collection of polymeric beads is preferably made by the method of the present invention. The polymeric beads contain polymer. Polymeric beads are particles that are solid at 25° C. and that contain polymer in the amount, by weight based on the weight of the polymeric particles, of 90% or more; more preferably 95% or more.

The polymeric beads may be macroporous beads or gel beads. Preferred are gel beads.

Preferably the polymeric beads have volume average particle diameter of 50 µm or larger; more preferably 100 µm or larger; more preferably 200 µm or larger; more preferably 400 µm or larger. Preferably the polymeric beads have volume average particle diameter of 1,500 µm or lower; more preferably 1,000 µm or lower.

Preferred polymers in the polymeric particles are the polymers formed by free radical polymerization of the preferred vinyl monomers described above. Preferably the polymer contains polymerized units of styrenic monomer in the amount, by weight based on the weight of the polymer, of 5% or more; more preferably 25% or more; more preferably 50% or more; more preferably 75% or more; more preferably 85% or more; more preferably 95% or more. The types of monomers preferred as polymerized units of the polymer are the same as those described above as preferred for use in the polymerization process.

Preferred polymers have polymerized units of multifunctional vinyl monomer in an amount, by weight based on the weight of the polymer, of 0.3% or more; more preferably 0.5% or more; more preferably 1% or more; more preferably 1.5% or more. Preferred polymers have polymerized units of multifunctional vinyl monomer in an amount, by weight based on the weight of the polymer, of 25% or less; more preferably 15% or less; more preferably 11% or less; more preferably 6% or less.

Preferred polymers have polymerized units of monofunctional vinyl monomer in an amount, by weight based on the weight of the polymer, of 99.7% or less; more preferably 99.5% or less; more preferably 99% or less; more preferably 98.5% or less. Preferred polymers have polymerized units of monofunctional vinyl monomer in an amount, by weight based on the weight of the polymer, of 75% or more; more preferably 85% or more; more preferably 89% or more; more preferably 94% or more.

The polymeric beads preferably have average sphericity of 0.8 or higher; more preferably 0.85 or higher; more preferably 0.9 or higher; more preferably 0.95 or higher.

A preferred use of the polymer produced in the free radical polymerization process of the present invention is to be used in a conversion process to produce an ion exchange resin. Ion exchange resins fall into the following categories. Weak base anion exchange resins have pendant amino groups that are primary, secondary, or tertiary. Strong base anion exchange resins have pendant quaternary amino groups. Weak acid cation exchange resins have pendant carboxylic acid groups. Strong acid cation exchange resins have pendant sulfonic acid groups. When any of these pendant functional groups have been attached to a polymer bead, the bead is referred to as a "functionalized resin."

Typically, in the preparation of weak base anion exchange resins from polymeric beads such as crosslinked polystyrene beads, the beads are advantageously haloalkylated, preferably halomethylated, most preferably chloromethylated, and the ion active exchange groups subsequently attached to the haloalkylated copolymer. Typically, the haloalkylation reaction consists of swelling the crosslinked addition copolymer with haloalkylating agent, preferably bromomethylmethyl ether, chloromethylmethyl ether, or a mixture of formaldehyde and hydrochloric acid, most preferably chloro-methylmethyl ether and then reacting the copolymer and aloalkylating agent in the presence of a Friedel-Craft catalyst such as zinc chloride, iron chloride, or aluminum chloride. Typically, a weak base anion exchange resin is prepared by reacting the haloalkylated copolymer with ammonia, a primary amine, or a secondary amine. Typically, a strong base anion exchange resin is prepared by reacting the haloalkylated copolymer with a tertiary amine.

Typically, in the preparation of strong acid cation exchange resins from polymeric beads such as crosslinked polystyrene beads, the beads are advantageously sulfonated. Generally, the bead is swollen using a suitable swelling agent and the swollen bead reacted with a sulfonating agent such as sulfuric acid or chlorosulfonic acid or sulfur trioxide or a mixture thereof.

It is contemplated that the polymeric beads of the present invention would be useful for a variety of purposes. Functionalized polymeric beads would be useful for many of the purposes where ion exchange resins are useful. For example, it is expected that functionalized polymeric beads of the present invention would be useful as water-purification resins or as catalysts.

Some of the benefits that are expected from the present invention are explained as follows. In historical processes of suspension polymerization (i.e., processes that were known prior to the present invention and that did not involve feeding of monomer during the polymerization process as described in the present invention), the amount of multifunctional vinyl monomer determined both the WIC and other resin properties. In order to achieve a target MEW value, a sufficient amount of multifunctional vinyl monomer was used, and, if that amount of multifunctional vinyl monomer caused a degradation in the other resin properties, that degradation had to be accepted as inevitable. In contrast, in the practice of the present invention, a lower amount of multifunctional vinyl monomer results in the MEW that formerly could only be obtained with larger amounts of DVB. Therefore, by using the present invention, the target MEW can be reached while reducing the risk of the degradation of properties that can be caused by high levels of multifunctional vinyl monomer. Thus it can be considered that the method of the present invention makes more efficient use of the multifunctional vinyl monomer that is present in the final bead by allowing the target properties to be reached while using reduced amounts of multifunctional vinyl monomer.

The following are examples of the present invention.

The following terms, abbreviations, and materials were used:

jetting=introducing monomer droplets into the aqueous medium using the jetting procedure described in U.S. Pat. Nos. 4,444,960 and 4,623,706 tBC=4-t-butylcatechol, which is present in the grade of DVB that was used.

DVB=divinylbenzene. The grade of DVB that was used was manufactured by the Dow Chemical Company and was a mixture that contained 63% pure divinylbenzene and approximately 37% ethylvinylbenzene (EVB) by weight. The percentages of DVB shown herein refer to the amount of pure DVB. It is assumed that EVB will also be present, in a weight ratio of DVB:EVB of approximately 63:37.

CMMC=carboxymethyl methylcellulose, manufactured by The Dow Chemical Company

PVOH=SELVOL™ 523 polyvinylalcohol, from Sekisui Specialty Chemicals

SBA=strong base anion exchange resin; copolymer of styrene/DVB functionalized with quaternary ammonium groups SAC=strong acid cation exchange resin; copolymer of styrene/DVB, functionalized sulfonic acid groups Tris=tris(hydroxymethyl)aminomethane, 20% by weight solution in water VPBA=4-vinylphenyl boronic acid BPO=benzoyl peroxide, purity 75% by weight DI water=deionized water GA=gradual addition MHC=moisture hold capacity ambient temperature=approximately 23° C.

In preparation of the droplet mixtures or the aqueous media described below, some partial mixtures were sometimes heated above 25° C. to achieve good mixing. However, at the time when the droplets were formed and suspended in the aqueous medium, all the ingredients were at ambient temperature.

Where copolymers were converted to SAC resins, conversion was performed by standard sulfonation processes, using sulfuric acid, to achieve a degree substitution such that 95 mole % or more of the aromatic rings of polymerized units of monofunctional vinyl monomer have a sulfonate group.

The Moisture Hold Capacity (MHC) was measured as follows. In brief, excess water was removed from the resin under humid air to produce resin that is dewatered but damp. The damp resin is weighed, dried, and weighed again. The relative weight loss upon drying is the Moisture Hold Capacity. In detail, 50 mL of the collection of resin particles was mixed with 50 mL of deionized (DI) water. The mixture was placed in a Buchner funnel on a vacuum flask, and water was allowed to drain from the sample under gravity. The sample was covered with a rubber stopper that was connected to a hose that supplies air having 100% relative humidity from a humidifying tower. Vacuum was applied to the vacuum flask to provide air flow of 4.0 L/min for 5 minutes. The result is dewatered damp resin. Then 4 to 5 grams of resin was weighed (Wm), then dried in an oven at 105° C. for 18 hours, then weighed again (Wd). Moisture Hold Capacity (MHC) was given by MHC (%)=100*(Wm−Wd)/Wm In all examples, the weight ratio of droplet ingredients to aqueous phase ingredients was 0.61:1. Droplets were formed by jetting as defined above.

Comparative A-1Comp and Example A-2d.

Droplets were formed by jetting. The compositions of the droplets in the following examples were as follows. Amounts are % by weight based on the weight of the monomer droplets. Total weight of each monomer droplet composition was 100%. Samples with suffix "Comp" are used in comparative methods. In all cases, the aqueous phase concentration of stabilizers is such that the number percentage of beads having sphericity of 0.8 or higher is 99% or higher, based on the total number of beads. In all cases, the aqueous or monomer phase concentration of stabilizer aid is such that the number percentage of beads having sphericity of 0.8 or higher is 99% or higher, based on the total number of beads. In all cases, the aqueous phase concentration of latex inhibitor is such that the weight percentage of emulsion polymer at the end of the reaction is less than 0.5%, based on the total weight of polymeric beads. In all cases, harmonic mean size of the final polymer particles was 430-470 microns.

| Example | DVB | Initiator | Stabilizer Aid | Styrene |
| --- | --- | --- | --- | --- |
| A-1Comp | 4.65 | BPO | VPBA | balance |
| A-2d | 4.65 | BPO | VPBA | balance |

The compositions of the aqueous media in the following examples were as follows.

| Example | Stabilizer System | Latex Inhibitor |
| --- | --- | --- |
| A-1Comp | CMMC + PVOH | $NaNO_2$ |
| A-2d | CMMC + PVOH | $NaNO_2$ |

Aqueous suspension polymerization was conducted on the suspension as follows.

For A-1Comp, aqueous suspension polymerization was conducted on the reaction mixture as follows. A combination of reaction temperature and BPO concentration was chosen to result in an extent of conversion of 80-85% within 330-390 minutes. Once conversion to polymer was in the 80-85% range, pH was adjusted by Tris addition to the reactor—such that the final pH is in the 8-9 range. The reaction system was heated to 97° C. After 1 hour at 97° C., the system was cooled to ambient temperature and the beads were dewatered, washed with water, and dried at ambient temperature. Two identical polymerizations were conducted.

For Example A-2d, aqueous suspension polymerization was conducted on the reaction mixture as follows. A combination of reaction temperature and BPO concentration was chosen to result in an extent of conversion of 80-85% within 390-550 minutes. Once reaction temperature was reached, a continuous feed of styrene to the reactor was started and maintained from 0% extent to 56% extent. The styrene feed rate varied with time.

Once conversion to polymer was in the 60-75% range, Tris was added to the reactor, such that the final pH was in the 8-9 range. The reaction system was heated to 97° C. within 60 minutes of the Tris addition. After 1 hour, the system was cooled to ambient temperature and the beads were dewatered, washed with water and dried at ambient temperature.

Moisture hold capacities (MHC) of the sulfonated resins were as follows:

| Sample | MHC |
|---|---|
| sulfonated Comparative A-1Comp | 63.2 |
| sulfonated Example A-2d | 62.7 |

The MHC values were effectively the same for the two samples, but Example A-2d had only 4.1% DVB, while the comparative had 4.65% DVB. Thus the example had the same MHC with 12% less DVB.

The invention claimed is:

1. A process of making a collection of polymeric beads, wherein the beads comprise
   (i) 75 to 99.7% by weight, based on the weight of the bead, polymerized units of monofunctional vinyl monomer, and
   (ii) 0.3 to 25% by weight, based on the weight of the bead, polymerized units of multifunctional vinyl monomer;
   wherein the process comprises
   (a) providing an aqueous suspension of monomer droplets comprising initiator, multifunctional vinyl monomer, and monofunctional vinyl monomer;
   (b) initiating polymerization of the monomer in the monomer droplets;
   (c) while the polymerization of the monomer in the monomer droplets is occurring, adding a monomer feed solution to the suspension,
      wherein the adding begins at a time when the extent of polymerization of monomer in the monomer droplets (EXTSTART) is 0% to 50%, and
      wherein the adding ends at a time after EXTSTART when the extent of polymerization of monomer in the monomer droplets (EXTSTOP) is 5% to 100%;
      wherein the feed solution comprises monomer in an amount, by weight based on the weight of the feed solution, of 90% to 100%;
      wherein the feed solution comprises monofunctional vinyl monomer in an amount, by weight based on the weight of the feed solution, of 50% to 100%.

2. The process of claim 1, wherein the quantity EXTDIF=EXTSTOP−EXTSTART is 5% or more.

3. The process of claim 1, wherein the monofunctional vinyl monomer comprises styrene.

4. The process of claim 1, wherein the multifunctional vinyl monomer comprises divinylbenzene.

5. The process of claim 1, wherein the weight ratio of multifunctional vinyl monomer to monofunctional vinyl monomer in the feed solution is lower than the weight ratio of multifunctional vinyl monomer to monofunctional vinyl monomer in the monomer droplets.

* * * * *